(12) United States Patent
Moorhouse, Sr.

(10) Patent No.: US 6,241,087 B1
(45) Date of Patent: *Jun. 5, 2001

(54) COMPACT DISC STORAGE DEVICE WITH LOCATING PROJECTIONS

(75) Inventor: Richard McAlister Moorhouse, Sr., Scarborough (GB)

(73) Assignee: Duraweld Limited, Yorkshire (GB)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/360,663

(22) Filed: Jul. 26, 1999

(30) Foreign Application Priority Data

Nov. 24, 1998 (GB) .................................................. 9825606

(51) Int. Cl.⁷ .............................. B65D 85/57; B42F 13/02
(52) U.S. Cl. ...................... 206/308.1; 206/311; 206/425; 206/472; 402/8; 402/15; 402/22; 402/79
(58) Field of Search .............................. 206/308.1, 311, 206/425, 472, 450; 493/268; 402/15, 22, 80 P, 8, 13, 14, 79

(56) References Cited

U.S. PATENT DOCUMENTS

| | | | |
|---|---|---|---|
| 62,342 | * | 2/1867 | Kirk et al. .............................. 493/268 |
| 2,178,404 | * | 10/1939 | Powter et al. ........................ 206/450 |
| 3,331,373 | * | 7/1967 | Lohmeier ................................. 402/8 |
| 3,362,412 | * | 1/1968 | Moller ..................................... 402/15 |
| 4,135,832 | * | 1/1979 | Saltz ....................................... 402/15 |
| 4,192,620 | * | 3/1980 | John ........................................ 402/15 |
| 4,261,664 | * | 4/1981 | Crawford ........................... 402/22 X |
| 4,655,388 | * | 4/1987 | Fleming . |
| 5,054,271 | * | 10/1991 | DeWoskin ........................ 493/124 X |
| 5,167,463 | * | 12/1992 | Corbishley .............................. 402/8 |
| 5,501,540 | * | 3/1996 | Ho ..................................... 402/79 X |
| 5,588,528 | * | 12/1996 | Ozeki ............................... 206/311 X |
| 5,720,384 | * | 2/1998 | Wu-Chen .......................... 206/311 X |
| 5,833,063 | * | 11/1998 | Ho .................................... 206/311 X |
| 5,882,748 | * | 3/1999 | Tomoda ......................... 206/308.1 X |

FOREIGN PATENT DOCUMENTS

0479556 * 4/1992 (EP) .

* cited by examiner

Primary Examiner—Bryon P. Gehman
(74) Attorney, Agent, or Firm—Watts Hoffmann Fisher & Heinke

(57) ABSTRACT

A storage device for a plurality of storage members each adapted to accommodate at least one compact disc comprises a base member formed from synthetic plastics material and incorporating integral locating prongs formed by cutting and deforming a portion of the base member. The locating prongs are adapted for engagement with complimentary apertures in each of the storage members and are resiliently deformable so that they may be deformed to pass through the apertures in the storage members and then resiliently expand so that portions thereof extend beyond the apertures to retain the storage members in position on the base member.

22 Claims, 2 Drawing Sheets

COMPACT DISC STORAGE DEVICE WITH LOCATING PROJECTIONS

BACKGROUND OF THE INVENTION

This invention relates to storage devices for compact discs.

Compact discs are generally sold in rigid plastic containers having a base incorporating a recess for accommodation of a compact disc and having a lid which is closed over the disc when in position. However these containers are inconvenient as a means of storing compact discs in a readily accessible manner and alternative forms of storage are available for this purpose. One such product incorporates a series of sheet members having transparent pockets on one or both faces. Where the product has pockets on both faces, one pocket is dimensional to receive a compact disc, and the other receives a graphic sheet giving information on the matter held on the disc. The sheet members are adapted to be mounted in an outer cover or binder to which they are detachably connected. Hitherto such binders have been constructed from cardboard and the sheet members or sleeves are secured to the binders by two part threaded metal fasteners engageable with apertures punched in edge regions of the sleeves, whereby a series of sleeves can be detachably mounted in each binder to hold a plurality of compact discs in a readily accessible yet protected manner.

Products of this kind suffer from the disadvantage that the outer cover is lacking in durability. In addition attachment and removal of sleeve members is time consuming and the fasteners are expensive and both difficult and time consuming to manipulate in use. The fasteners also require to be securely attached to the outer cover or binder with the result that the products are complex and hence relatively expensive to produce.

It is an object of the present invention to obviate or mitigate these disadvantages.

BRIEF SUMMARY OF THE INVENTION

In one aspect, the invention provides a storage device for a plurality of storage members in the form of compact disc holders each adapted to accommodate at least one compact disc, the storage device comprising a base member formed from synthetic plastics material and incorporating integral locating means formed by cutting and deforming a portion of the base member, said locating means being adapted for engagement with complimentary aperture means formed in each of said storage members, and said locating means being resiliently deformable whereby it may be deformed to pass through said aperture means and then resiliently expands such that portions thereof extend beyond said aperture means to retain the storage members in position on the base member.

Preferably said locating means comprises a pair of locating members spaced apart on said base member and adapted for engagement in respective complimentary apertures formed at edge regions of said storage members.

Preferably said locating members are of tapered form having a narrow region to facilitate initial engagement with said apertures and a wider region which in its undeformed state is of greater extent than the width of said apertures, said wider region being deformable to enable passage of the locating member through an associated aperture and thereafter expanding resiliently to its undeformed state in which it prevents disengagement of storage members from the base member. Advantageously said locating members comprise lugs of arrowhead shape.

Preferably said base member is of corresponding shape to and slightly larger extent than said storage members. Preferably also the device incorporates a front cover member hingedly connected to said base member and adapted in a closed position to extend over said base member to enclose said storage members between said base member and said cover member.

Preferably said base and cover members are interconnected by a spine member adapted to space same apart by a distance sufficient to accommodate the number of storage members and compact discs the device is designed to accommodate. Preferably the base and cover members are of the same size and shape.

Locking means may be provided to retain the base and cover members in their closed position. Said locking means may comprise a locking flap hingedly connected to one of said members, a flexible tab formed on said flap and a slot in the other of said members with which the tab is adapted to engage. Preferably the tab is formed from the material of the flap.

In another aspect, the invention provides a jig for assembling a storage device as described above with at least one storage member, the jig comprising a support member to support the storage device and projecting means extending from the support member to cooperate with said locating means on the support member to move the locating means to a position projecting from the base member, and to hold the locating means in said position, whereby the or each storage member can be assembled with the storage device in a manner such that said projecting means and said locating means pass through the aperture means in the or each storage member such that, on removal of the storage device from the jig, the locating means are operable to retain the or each storage member on the base member.

Preferably, the projecting means is adapted to push the locating means to a position extending transverse from the base member, desirably substantially at right angles to the base. Preferably, the projecting means comprises a pair of projecting members spaced apart on said support member, each projecting member being adapted to cooperate with a respective locating member of the storage device.

The jig may comprise a positioning member provided on the support member, the positioning member comprising raised elements extending from the support member and defining a shape conforming to the shape of the storage device.

The projecting members may be in the form of prongs formed from a suitable plastics material, for example nylon.

In yet another aspect of this invention, there is provided a method for assembling a storage device as described above with at least one storage member, the method comprising providing a jig having projecting means, arranging the storage device such that the projecting means cooperate with said locating means on the support member to move the locating means into a position projecting from the base member, arranging the or each storage member over the storage device on the jig such that the projection means and the locating means pass through the aperture means in the or each storage member, and thereafter removing the assembled storage device and storage members from the jig.

Preferably the projecting means push the locating means such that they extend transverse to the base member, desirably substantially at right angles thereto.

BRIEF DESCRIPTION OF THE DRAWINGS

Embodiments of the invention will now be described, by way of example only, with reference to the accompanying drawings in which.

DETAILED DESCRIPTION OF THE INVENTION

Figure 1:
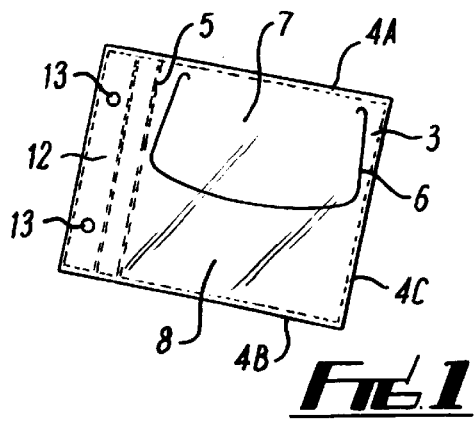
FIG. 1 shows one side of a storage member or sleeve adapted to accommodate one or more compact discs.
Figure 2:
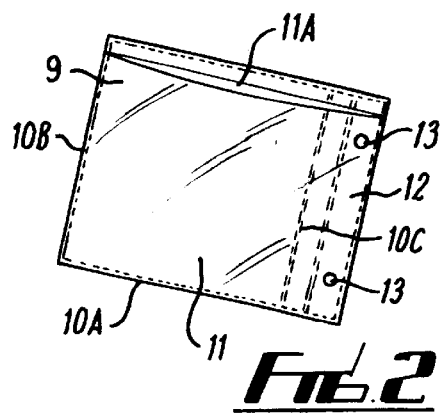
FIG. 2 shows the other side of the sleeve shown in FIG. 1.

Referring to FIGS. 1 and 2, there is shown a flexible storage member designed to accommodate a compact disc. The storage member comprises a central backing member of a non woven material, for example polypropylene or a PVC based material. The non-woven material is free of particles, lint and dust to prevent contamination of the compact disc. To one surface of the central backing member is secured a sheet of transparent plastics material 3, for example polypropylene or PVC. The transparent sheet 3 is adhered to the backing sheet by ultra-sonic welding or other suitable means along the top, bottom and outer edges 4A, 4B and 4C of the backing sheet and along a line 5. A portion of the transparent sheet is cut along a line 6 to define a flap 7 and the lower portion of the transparent sheet forms a pocket 8 into which a compact disc can be inserted or retrieved by lifting the flap 7. As seen in FIG. 2 a further sheet of transparent plastics material 9, for example polypropylene or PVC, is fixed to the opposite face of the backing sheet and is secured thereto at its bottom and outer edges 10A and 10B and along a line 10C corresponding to the line 5 of FIG. 1. This transparent sheet forms a further pocket 11 into which an information sheet or other literature relating to the matter stored on the compact disc can be inserted through its upper edge 11A.

Figure 3:
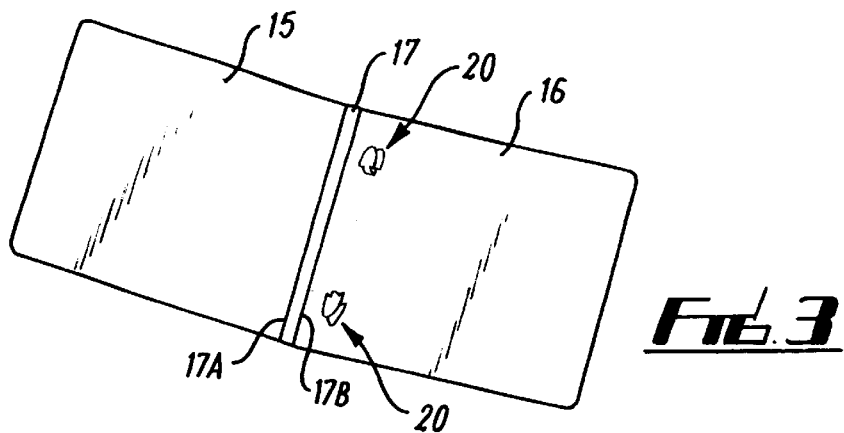
FIG. 3 is a perspective view of one form of storage device according to the invention in an open condition.
Figure 5:
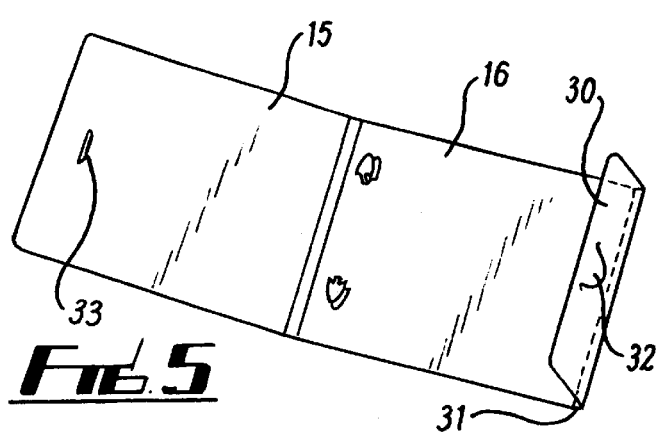
FIG. 5 is a view similar to FIG. 3 showing an alternative embodiment.

A portion 12 of the storage member forms an attachment member by means of which the storage member may be detachably located in a storage device or cover according to the invention, examples of which are shown in FIGS. 3 and 5. For this purpose apertures 13 are formed in the attachment member 12 for engagement with locating members on the cover as described hereafter. Storage members of the kind described above are known as such and do not in themselves form part of the present invention.

Referring to FIG. 3 there is shown a storage device or cover for a plurality of storage members or sleeves of the kind shown in FIGS. 1 and 2. The storage device comprises front or cover member 15 and a back cover or base member 16 hingedly connected together with a spine 17. The cover members and spine are formed from a single sheet of synthetic plastics material, for example polypropylene and may be folded about hinge lines 17A, 17B to overlie one another. The back and front cover members are of the same shape as but slightly larger in size than the storage members shown in FIGS. 1 and 2.

A pair of locating members 20 are provided on the back cover 16 of the storage device. One such locating member is shown in greater detail in FIG. 4 and comprises a lug 21 of generally arrowhead shape connected by a stalk-like member 22 to the base member 16 itself. The tab 21 and stalk 22 are formed by cutting from the material of the base member 16 and by folding about hinge lines 23 and 24 whereby to bring the tab 21 into a position displaced from but parallel to the surface of the base member 16. Two such locating members are provided towards the upper and lower edges of the base member 16 adjacent to the spine 17, the respective lugs 21 being directed away from one another as seen in FIG. 3.

The lugs 21, being formed from the plastics material of the base member 16 itself, are resiliently deformable. The base region 25 of each lug adjacent to the stalk 22 is of greater width than the diameter of the apertures 13 in the attachment portion 12 of the sleeve shown in FIGS. 1 and 2. The tip 26 of each lug 21 facilitates engagement with the associated aperture 13.

In use of the storage device, the locating lugs 21 are passed through the associated apertures 13 in each sleeve member by deforming the lug 21 to permit the base portion 25 to pass through the aperture 13, following which the base portion expands by virtue of the inherent resiliency of the material from which it is constructed and thus projects beyond the aperture into contact with the adjacent surface of the portion 12 of the sleeve. In this way the sleeve is retained in position on the base member 16 by means of the lugs 21. A plurality of similar sleeve members may be accommodated on the locating lugs dependent on the length of the stalk members 22 and the width of the spine 17. The assembled unit thus comprises a handy holder of compact discs, each sleeve being hingedly movable about the hinge line 5/10C to enable successive discs to be inspected and removed for use or replaced as required.

To remove one or more sleeves the base regions of the locating lugs 21 are deformed to permit them to pass through the apertures 13 thus releasing the sleeves from the device.

FIG. 5 shows a modified form of device incorporating latch means to retain the back and front covers in the closed position. For this purpose a flap 30 is hingedly connected to the outer edge of the base member 16 by way of a spine member 31 equal in width to the spine member 17. A tab 32 is formed in the flap 30 by cutting the material from which the flap is formed. A slot 33 is provided adjacent the outer edge of the cover member 15 and is engageable by the flap 32 when the cover is in its closed position to retain the back and front cover members in place around the sleeves. In other respects the embodiment shown in FIG. 5 is constructed and operates in the manner described with reference to FIG. 3.

Thus attachment of the sleeves to and removal of the sleeves from the cover may be effected in a simple and quick manner by deformation of the integral locating lugs, thereby enabling folders incorporating desired numbers of sheets to be readily assembled as desired. Each operation requires only that the lugs be deformed to initiate passage through the associated apertures and thereafter the lugs expand by virtue of the resilient nature of the material from which they are constructed so as to automatically return to their locking condition. Separate screwing and unscrewing operations as have been necessary with similar products proposed hitherto are eliminated, thereby greatly simplifying ease of operation. Storage devices according to the embodiments may also be very rapidly and economically produced since the entire device is formed from a single sheet of plastics material from which the locating lugs, and the latch member if provided, may be quickly and easily formed by simple cutting and folding operations.

Figure 6:
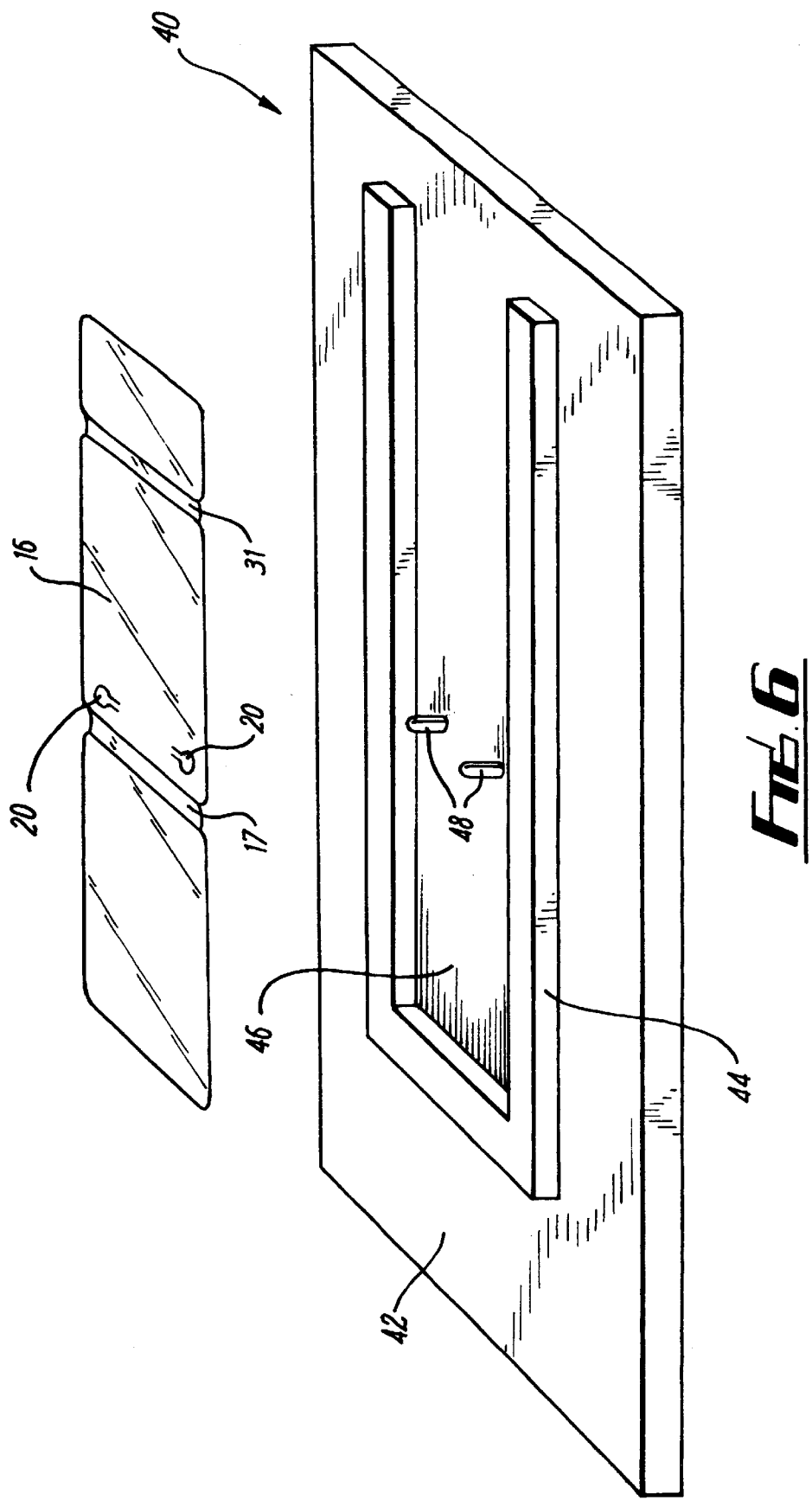
FIG. 6 shows a jig for assembling a storage device.

Referring to FIG. 6, there is shown a jig 40 for assembling a storage device with a plurality of storage members, as described above. The jig 40 comprises a support member 42, and a positioning member 44 raised from the support member 42 and defining a recess 46 in the shape of the storage device. The jig 40 further includes projecting means in the form of a pair of prongs or projecting members 48 extending upwardly from the support member 42. The projecting members 48 are arranged thereon so as to cooperate with the locating members 20 provided on the base member 16 of the storage device 20 when the storage device is arranged in the recess 46.

In operation, the storage device is placed on the support member 42 in the recess 46 and the projecting members 48 push the lugs 21 outwardly such that both the legs 21 and the stalk members 22 project substantially at right angles thereto from the base member 16. A plurality of storage members, as described above can then be arranged on the base member 16 such that the apertures 13 of each of them passes over the projecting members 48 and the outwardly extending lugs 21 thereby causing the lugs 21 to deform and expand, as described above.

Figure 4:
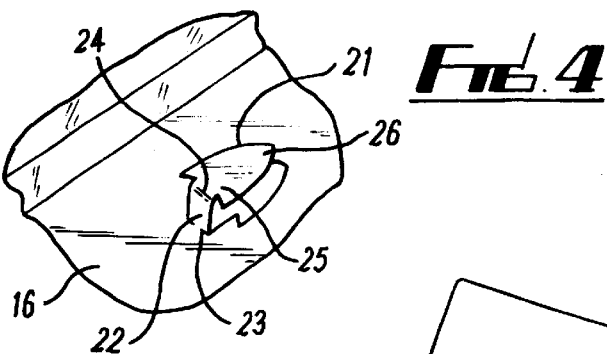
FIG. 4 is an enlarged perspective view showing a locating member incorporated in the device of FIG. 3.

When the required number of storage members have been arranged on the storage device, the storage device can be removed from the jig 40, and each of the lugs 21 can be pushed into its position for holding the storage members, as shown in FIGS. 3, 4 and 5. This can be done either by pressing down on the lugs 21 or by closing the cover member 15.

In the embodiment shown in FIG. 6, the storage device is provided with rounded corners adjacent each of the spines 17, 31 corresponding to the invention described in our U.K. Patent No. 2250956.

Various modifications may be made without departing from the invention. For example the storage device may be designed to accommodate storage members or sleeves of different construction and the sleeves themselves may be adapted to accommodate other forms of article such as computer discs. The shape and dimensions of the locating devices may vary from those shown and only one or more than two such devices may be provided if desired. The shape and size of the front and back cover members may be altered and if desired the front cover member may be omitted. The device may also be formed from plastics materials other than those referred to or from other resiliently deformable material.

Whilst endeavoring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

I claim:

1. A storage device for compact discs comprising:
  a) a base member;
  b) the base member being formed from synthetic plastic material and being cut to define integral locating projections extending generally parallel to an edge of the member;
  c) the projections being deformable into operative positions in which they project upwardly from the base member in a free-standing manner;
  d) a disc holder having a main body portion defining a pocket adapted to receive a compact disc;
  e) the holder including an attachment portion connected to said body portion by a hinge line and incorporating at least two apertures spaced apart in the direction of said hinge line;
  f) the holder being attached to the base member with said edge of the base member extending parallel to said hinge line;
  g) said projections extending through said apertures in the attachment portion of said disc holder;
  h) said projections each having a resiliently deformable stem and a retaining formation; and,
  i) the retaining formations being deformable to pass through said apertures and then resiliently expand such that portions thereof extend beyond said apertures and the stems extend through the apertures whereby the upstanding projections serve as the sole means of retaining the compact disc holders in position on the base member.

2. A storage device according to claim 1 wherein said projections are of tapered form having a narrow region to facilitate initial engagement with said apertures and a wider region which in its undeformed state is of greater extent than the width of said apertures, said wider region being deformable to enable passage of the projection through an associated aperture and thereafter expanding resiliently to its undeformed state in which it prevents disengagement of each disc holder from the base member.

3. A storage device according to claim 1 wherein said retaining formations are of arrowhead shape.

4. A storage device according to claim 1 wherein said base member is of corresponding shape to and slightly larger extent than said disc holder.

5. A storage device according to claim 1 further including a front cover member hingedly connected to said base member and adapted in a closed position to extend over said base member to enclose said disc holder between said base member and said cover member.

6. A storage device according to claim 5 wherein said base and cover members are interconnected by a spine adapted to space the base and cover members apart by a distance sufficient to accommodate the number of disc holders and compact discs the device is designed to accommodate.

7. A storage device according to claim 6 wherein said base and cover members are of the same size and shape.

8. A storage device according to claim 7 including locking means to retain said base and cover members in their closed positions.

9. A storage device according to claim 8 wherein said locking means comprises a locking flap hingedly connected to a selected one of said base member and cover member, said flap including a flexible tab and the other of said base and cover member including a slot with which the tab is adapted to engage.

10. A storage device according to claim 9 wherein said tab is formed from the material of said flap.

11. A storage device according to claim 5 formed from a single sheet of flexible plastics material by cutting and folding.

12. A storage device according to claim 1 formed from polypropylene.

13. A storage device according to claim 1 wherein said projections are deformable such that portions thereof extend generally parallel to said edge and overlie the compact disc holder following attachment of the holder to the projections to additionally secure the compact disc holder against detachment from the projections and provide a generally flat upper surface to the storage device.

14. A storage device for retention of a plurality of compact disc storage members comprising a unitary plastic sheet including:
  a) base and front cover elements hingedly connected by a spine;

b) the base element including two locating projections positioned near the spine;

c) the elements and spine being moveable between an open position and a closed position;

d) the elements and spine being generally coplanar when in the open position whereby to provide access to the projections for attachment and removal of such storage members;

e) the elements overlying one another in spine maintained spaced relationship when in the closed position to provide protective coverings for any such storage member positioned therebetween;

f) the locating projections being appropriately spaced to project through mounting apertures in such storage members whereby to connect such members to the device; and, g) the projections being readily deformable in a direction generally paralleling the spine for securing such storage members to the base element while allowing free movement of the elements between the open and closed positions.

15. The device of claim 14 wherein each of the projections includes an elongate stem having a transverse dimension less than the diameter of an aperture in one such storage member with which the device is to be used, each projection also having a head spaced from the base element, each head having a transverse dimension greater than such aperture for overlying each such storage member carried by the device, each said head being deformable to enable insertion of the head into and passage through one such aperture.

16. The device of claim 14 in combination with a flexible disc storage member comprising a backing and a plastic sheet secured to the backing along three sides to delineate a disc receiving space, the backing including an apertured attachment portion secured to the device by said projections.

17. A storage device for retention of a plurality of compact disc storage members comprising a unitary plastic sheet including:

a) a base element;

b) the base element including at least two integrally formed locating projections positioned near an edge of the element;

c) the locating projections being appropriately spaced to project through mounting apertures in such storage members whereby to connect such members to the device;

d) the projections each including an elongate stem bent upwardly from the plane of the base element and having a cross-section with a major dimension generally normal to said edge;

e) the stems being readily deformable in a direction generally paralleling the edge for securing such storage members to the base element;

f) said major dimension of each stem being less than the diameter of an aperture in one such storage member with which the device is to be used;

g) each projection also having a head spaced from the base element by the stem, each head having a transverse dimension greater than such aperture for overlying each such storage member carried by the device, each said head being deformable to enable insertion of the head into and passage through one such aperture; and, h) each stem being bendable in a direction generally parallel to the edge to position the head over each such storage member carried by the device whereby to secure such members to the device.

18. The device of claim 17 wherein the heads are of arrow shape.

19. A storage device according to claim 17 further including a front cover element hingedly connected to said base element and adapted in a closed position to extend over said base element to enclose such storage member between said base element and said cover element.

20. The device of claim 19 wherein a spine interconnects said elements and maintains the elements in interconnected spaced relationship.

21. A storage device according to claim 20 wherein said base and cover elements are of the same size and shape.

22. A storage device according to claim 21 including locking means to retain said base and cover elements in closed positions.

* * * * *

UNITED STATES PATENT AND TRADEMARK OFFICE
CERTIFICATE OF CORRECTION

PATENT NO.    : 6,241,087 B1
DATED         : June 5, 2001
INVENTOR(S)   : Richard McAlister Moorhouse Senior It is certified that error appears in the above-identified patent and that said Letters Patent is hereby corrected as shown below:

<u>Title page,</u>
Item [75], Inventor, should read -- Richard McAlister Moorhouse Senior --

Signed and Sealed this

Twenty-fifth Day of March, 2003

JAMES E. ROGAN
*Director of the United States Patent and Trademark Office*